May 1, 1973   W. W. DRUMMOND   3,730,813
APPARATUS FOR COMBINING TEXTILE STRANDS
Original Filed June 2, 1969   4 Sheets-Sheet 1

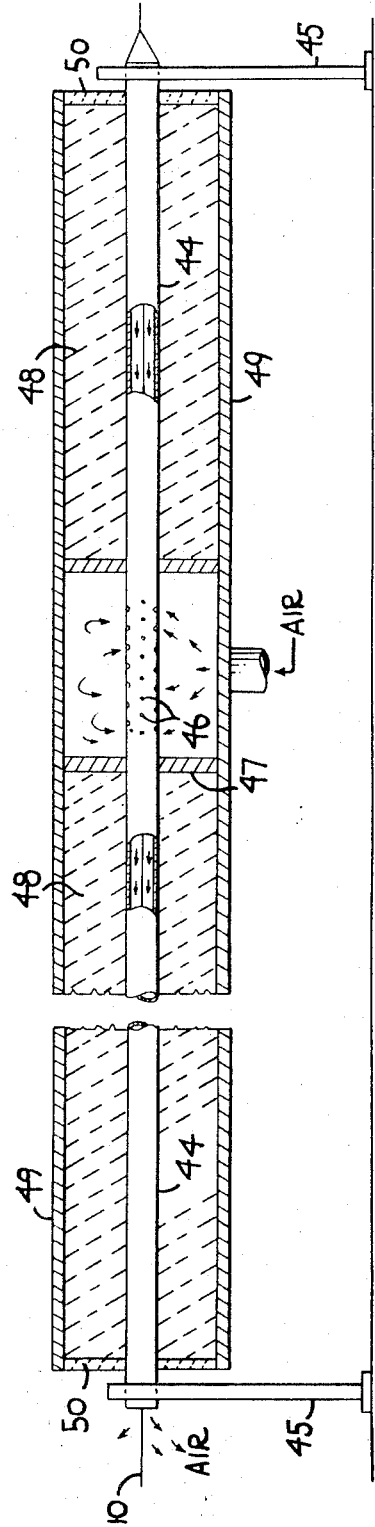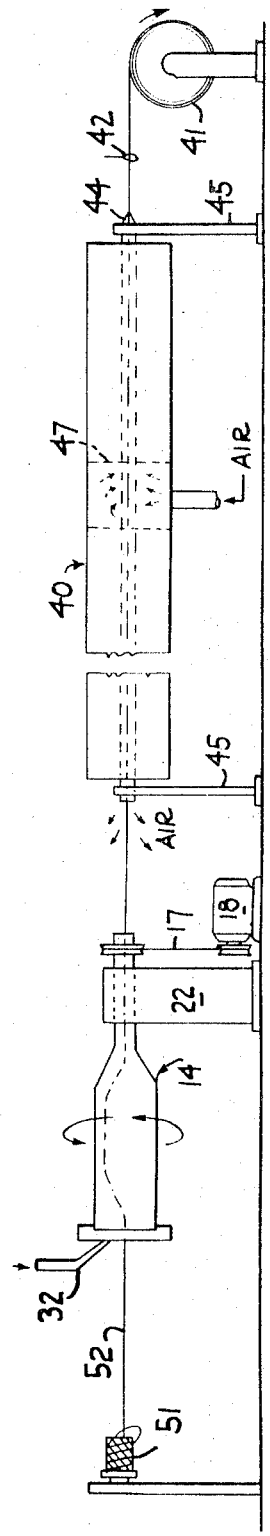

May 1, 1973   W. W. DRUMMOND   3,730,813
APPARATUS FOR COMBINING TEXTILE STRANDS
Original Filed June 2, 1969   4 Sheets-Sheet 3

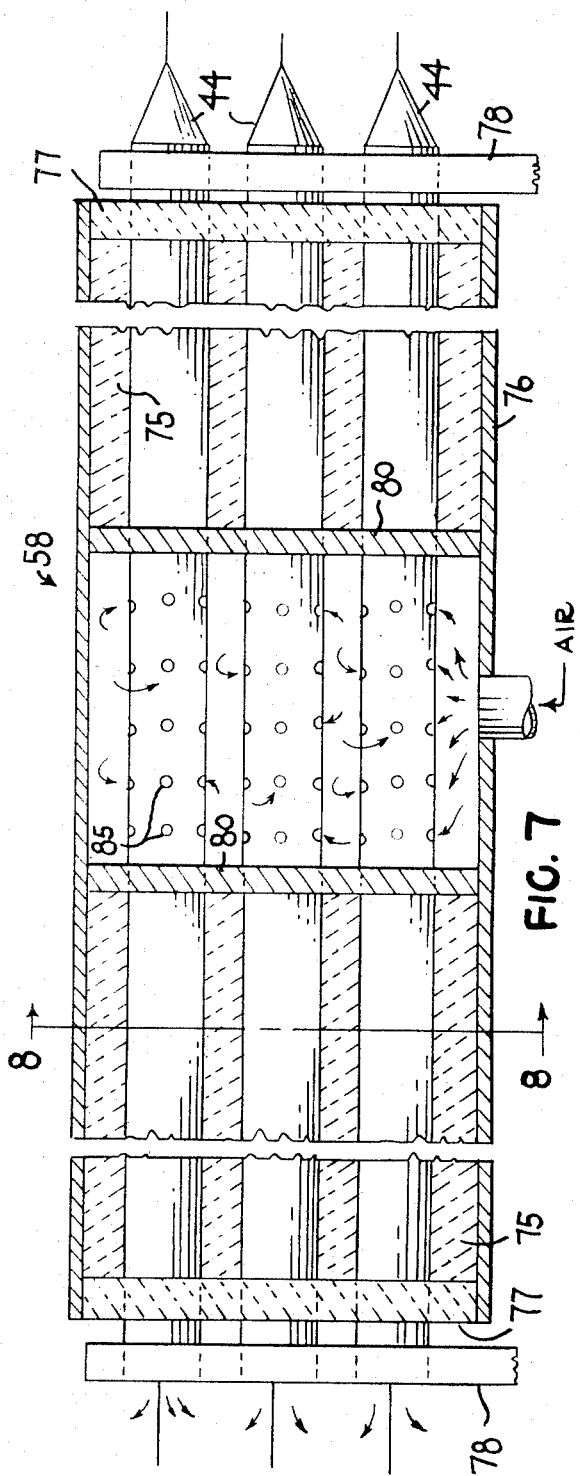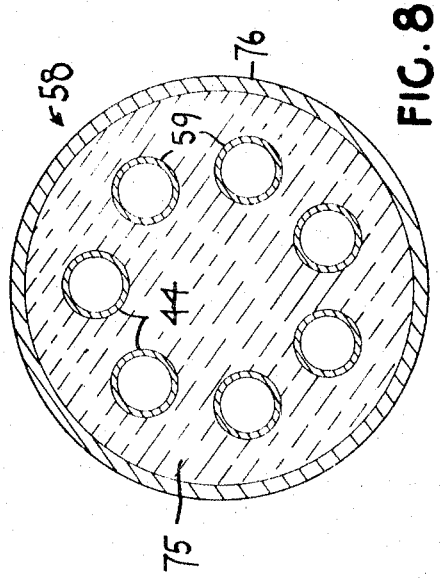

United States Patent Office 3,730,813
Patented May 1, 1973

3,730,813
APPARATUS FOR COMBINING TEXTILE STRANDS
Warren W. Drummond, Allison Park, Pa., assignor to PPG Industries, Inc., Pittsburgh, Pa.
Application Oct. 29, 1970, Ser. No. 85,253, now Patent No. 3,686,772, which is a division of application Ser. No. 829,521, June 2, 1969, now Patent No. 3,577,872. Divided and this application Mar. 31, 1972, Ser. No. 239,992
Int. Cl. D04h 3/12
U.S. Cl. 156—441                                    1 Claim

ABSTRACT OF THE DISCLOSURE

Means to coat individual strands. Oven means including a plurality of tubular driers, arranged in parallel and having drying gas flowing counter current to the direction of strand travel, receive each an individual coated strand. Means provide lateral motion to each strand while in the drier and means combine and collects the combined strand.

CROSS-RELATED APPLICATIONS

This is a division of application Ser. No. 85,253, filed Oct. 29, 1970, now U.S. Pat. 3,686,772 which is a division of application Ser. No. 829,521, filed June 2, 1969, now U.S. Pat. 3,577,872.

BACKGROUND OF THE INVENTION

Field of the invention

The present invention relates to apparatus for coating and impregnation of textile material and it has particular relation to the coating and impregnation of glass fiber strand, yarn and cord with coatings such as an elastomeric adhesive to render the glass fiber textile material suitable for reinforcement of elastomeric products such as tires and mechanical rubber goods. The invention also relates to apparatus for coating and impregnation of the inorganic and organic yarns with other coating materials.

DESCRIPTION OF THE PRIOR ART

Textile materials have been used for some time as a reinforcement for rubber products such as tires, timing belts, conveyors and hose. The textile materials are impregnated with a rubber adhesive prior to incorporation in the rubber product in order to provide good adhesion to the rubber and good reinforcement. Usually the textile is used in the form of cord.

In order to obtain uniformity of reinforcement performance of the cord, the adhesive coating has been applied to the individual fibers of the cord after the cord is twisted rather than before. The cord is temporarily untwisted during the coating. Examples of such coating processes are shown in U.S. Pat. Nos. 2,577,793; 2,601,394 and 2,731,069.

Glass fibers have more recently become commercially accepted as a textile material suitable for elastomer reinforcement. In order for glass fibers to be useful, it is important that each individual fiber in the yarn or cord be coated with the adhesive. This is required to prevent destruction of the cord by the abrasive action of the glass fibers against each other during flexing of the rubber product in manufacture and use. Thus, glass fiber strands have been coated with the elastomeric adhesive before twisting into cord because it is easier to achieve complete impregnation of the strand and coating of the individual fibers in untwisted form than in twisted form. U.S. Pat. No. 3,391,052 discusses coating of the glass fibers with various materials and suggests several coating methods such as flexing or bending the bundles of fibers by running them over rolls in the coating bath.

As briefly mentioned above, it is desirable to coat the twisted rather than untwisted textile material because the resultant product is more uniform throughout its length with regard to amount of twist and cord diameter. This is because twisting of a coated strand sometimes results in some portions of the length of cord that are undertwisted and other portions that are overtwisted because of non-uniformity of coating or variations in degree of cure if the coating contains a curable ingredient such as resorcinol formaldehyde. Attempts to deal with the problems in coating of twisted glass fiber cord are described in U.S. Pat. Nos. 3,339,357 and 3,432,332. These patents employ apparatus which open the fiber bundle during coating by untwisting or other means so as to aid in the impregnation. These various apparatus appear to be difficult to utilize in a controlled manner in a factory operation.

SUMMARY OF THE INVENTION

The present invention involves apparatus for coating of textile material while it is moved through a coating material which is under pressure and while the textile material has little or no tension exerted on it. The textile material is simultaneously false twisted and impregnated in a slack condition with the coating material which is under pressure. This is accomplished by feeding the textile material into one end of a rotating cylindrical chamber which contains a liquid layer of the coating material on its inside surface. The textile material sags by gravity or is otherwise directed into the coating material and is held against the interior surface of the rotating chamber, first by the coating material and then by the centrifugal force which is created by the rotation of the chamber and is transmitted through the coating material. It is essential that the textile material be slack or under very little tension to permit it to contact the coating material and inerior surface of the rotating chamber. If too much tension is applied to the textile material by tension devices, the textile material may be pulled out of the coating film by the winder and out of the false twisting and coating influence of the rotating chamber.

BRIEF DESCRIPTION OF THE DRAWINGS

The advantages of the invention are described in more detail in conjunction with the description of the drawings in which:

FIG. 3 is an enlarged diagrammatic view, partly in section, of a tube oven for drying the coating applied by the apparatus shown in FIG. 2;

FIG. 4 is a diagrammatic view of another form of the method and apparatus of the invention;

FIG. 7 is an enlarged view, partly in section of the multiple oven shown in FIG. 5, and FIG. 8 is a view in section, taken along lines 8—8 of FIG. 7.

In FIGS. 1 and 2 of the drawing, there is shown twisted glass fiber cord 10 which is fed from cylindrical textile package 12. The cord 10 is fed into a centrifugal coater 14 which is composed of a rotating chamber or cylinder 15 which is rotated by belt 17 which is driven by motor 18. As shown, the chamber is disposed horizontally, however, this is not necessary for the chamber can be vertically or otherwise disposed. The axis of the package 12 is perpendicular to the axis of the chamber. The cord is unwound from the side of the package 12 and fed directly from the side of the package 12 into the end of the chamber. The cord can also be fed overend from a bobbin or from the inside of a forming package.

Figure 1:
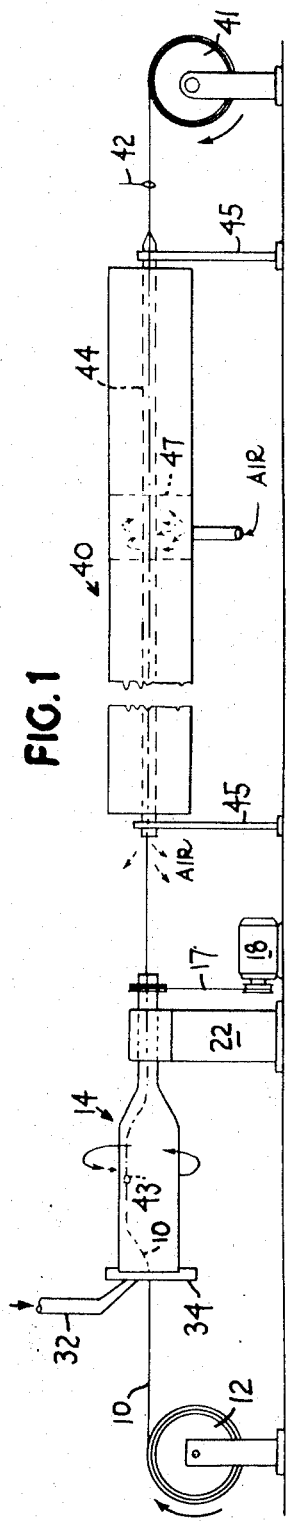
FIG. 1 is a diagrammatic view of the process and apparatus of the invention.

The chamber 15 is provided with bearings 20 which engage stationary support 22. The diameters of inlet opening 26 and exit opening 28 at opposite ends of the chamber are smaller than the inside diameter of the main or central portion 29 of the chamber between the ends of the chamber. This provides a well or reservoir inside the chamber to contain an elastomeric adhesive coating 30. The coating 30 is supplied to the interior of the chamber through tube 32 which is connected to a supply of the adhesive (not shown). A constantly metered amount of adhesive coating 30 is supplied to the chamber 15 so as to maintain a thick layer or film of the coating on the inside surface of the central portion 29 of the chamber. This coating layer is about ¼ inch to 1 inch thick, preferably at least twice the thickness of the cord being coated, while the chamber is rotating. An annular overflow trough 34 surrounds the inlet to the chamber 15 to catch any excess coating material which might flow out of the chamber.

After passing through the chamber 15, the coated and impregnated cord passes through a heated insulated tube 40 and then to take-up package 41. The coated cord is heated in tube 40 to remove moisture and optionally cure any curable ingredients in the coating. The cord passes through a traverse 42 prior to being wound on the take-up package so that the cord is wound in an open wind into a cylindrical take-up package 41. The package 41 is driven by a suitable conventional motor (not shown) which may be coordinated with the driving force of the feed package 12 so as not to remove the slack from the cord 10 as it passes through the cylinder 15. Both the feed and take-up packages may be surface driven so as to eliminate cord speed changes that would occur because of the constantly reducing diameter of the feed package and the constantly increasing diameter of the take-up package.

At startup, the cord 10 is unwound from package 12 and threaded through chamber 15 and tube oven 40 to take-up package 41. The cord has slack in it so that it rests against the lowermost section of the interior surface of the chamber 15 throughout the length of the central portion 29 of the chamber. Coating 30 is poured into the interior of the chamber through tube 32 so that the depth of the coating is substantial but not great enough to cause the coating to flow out either the inlet opening 26 or exit opening 28 of the chamber.

The chamber is then rotated at a speed of about 2,000 to 6,000 revolutions per minute so as to give the interior surface of the chamber 15 a speed of about 1,000 to 3,000 feet per minute and centrifugal pressures of 10 to 30 pounds per square inch. As the chamber rotates, the coating covers the entire interior surface of the central portion of the chamber. The cord 10 also moves along with the film of coating as the chamber rotates. At the same time the cord is moving with the interior surface of the chamber, it is advanced along the length of the chamber by the force exerted along the length of the cord by the take-up package. The tension on the cord is always kept less than the centrifugal force which holds the cord against the interior of the rotating chamber. To aid in directing and holding the cord against the interior of the rotating chamber, the cord can be threaded through a small metal eyelet 43 which lays inside the chamber and is free from attachment to the chamber. Rotation of the chamber causes the eyelet to be held by centrifugal force against the side of the chamber.

As the chamber 15 rotates, it carries the cord (and eyelet) with it. The movement of the cord 10 with the chamber can put a twist on the cord which extends back toward the feed package. The rotation of the chamber and the feed rate of the cord can be adjusted so that the twist in the cord is removed back at the coating position. The cord is in untwisted condition as it enters the chamber and while it is being rotated and impregnated in the chamber. The chamber is rotated in the direction opposite to the twist in the cord to achieve this result, i.e., the chamber is rotated to give an S false twist to Z twisted cord in order to untwist it.

The false twist lateral movement given to the cord passing through the chamber is present in the cord to a lesser degree as the coated cord passes through the tube oven 40 which is shown in greater detail in FIG. 3. This lateral movement provides a further beneficial result. The tube oven has a relatively small inside diameter, i.e. ½ inch to 1 inch in order to get efficient heat transfer to the coated cord; therefore, there is a good likelihood that the cord will occasionally come in contact with the hot walls of the tube 44. If the contact is continuously along the same line in the tube, there is a great likelihood of the coating on the cord stripping off and plugging the tube. The lateral motion of the cord as it passes through the oven prevents stripping off of the coating on the cord. The lateral contacting motion of the strand also acts as a self-cleaning action on the inside of the tube. To achieve self-cleaning it is preferable to have the tube diameter about ½ inch to 1 inch and operate the tube so that its interior surface is at a temperature of about 600° F. to 1200° F. i.e., a temperature sufficient to carbonize the organic materials deposited on the tube surface. The tube 40 can be made of an electrically conducting metal such as stainless steel and can be heated by passing electric current through it from bus bars 45.

Fresh air is forced along the interior of the tube 40 countercurrent to the movement of the coated cord to remove moisture and carbonized particles from the tube oven at the inlet end of the tube. The air is forced under pressure into the tube through opening 46 in the tube near the center and/or outlet end of the tube from a manifold 47 which surrounds the tube. The tube 44 is insulated with conventional insulating material 48 along its length except for that portion where the fresh air is introduced. The insulation is encased in a transite or aluminum tube 49 having transite plugs 50 at each end for holding the tube 44 and insulation 48.

In FIG. 4 of the drawing there is shown another embodiment of the invention which is useful for impregnating glass fiber textile material. In FIG. 4, the centrifugal coater 14, oven 40 and take-up package 42 are the same but the feed of the textile material is different. A rotating package 51 containing untwisted glass fiber strand or roving 52 is mounted ahead of the centrifugal coater 14 with the axis of the package 50 being in line with the axis of the cylindrical chamber 15 of the centrifugal coater. The package 51 is rotated at the same speed as the chamber 15 and the roving 52 is fed overend from the package 51 to the chamber 15. The roving remains untwisted as it passes through the chamber, but a twist is applied to it as it leaves the chamber on its way through the oven to the take-up package. This method of applying a twist to a strand is conventionally known as uptwisting. If the lineal speed of the strand is 100 feet per minute and the supply package is spun at 3,000 revolutions per minute, a twist of 30 turns per foot is applied to the coated strand. This process is very economical, particularly when strand forming packages are used as the feed package. As a further alternative to the process illustrated in FIG. 1, the coated strand can be twisted during take-up by use of conventional down twisting equipment.

Figure 5:
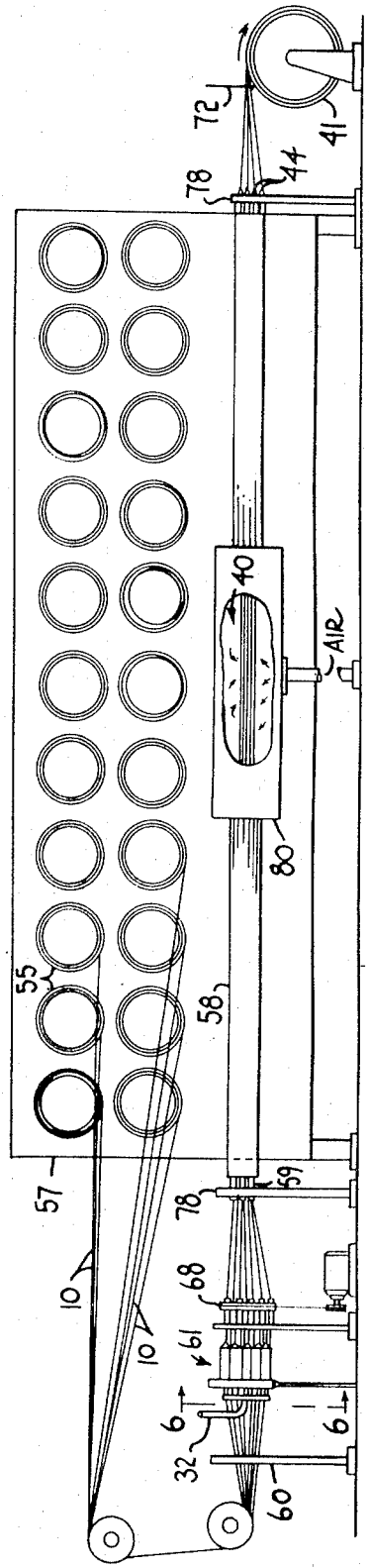
FIG. 5 is a diagrammatic view of a multiple form of the coater and oven of the invention.

In FIG. 5 there is shown another embodiment of the process illustrated in FIG. 1. Thick cords present a drying problem after coating. The process illustrated in FIG. 5 employs a plurality of centrifugal coaters 14 and ovens 40 to coat and dry a plurality of strands 10. The coated and dried strands are then combined just prior to being wound on a single take-up package 41. The dried strands 10 can still be slightly tacky when combined and thus will stick together and be capable of handling as an integral untwisted cord upon removal from the take-up package.

In FIG. 5 there is shown a plurality of forming packages 55 mounted on a creel 57 which is located above a cluster 58 of tube ovens 40. The location of the creel above the tube ovens permits utilization of the heat from the tube ovens to dry the forming packages on the creel.

The strands from the forming packages are passed through a suitable guide 60 and then into a cluster 61 of centrifugal coaters 14.

Figure 6:
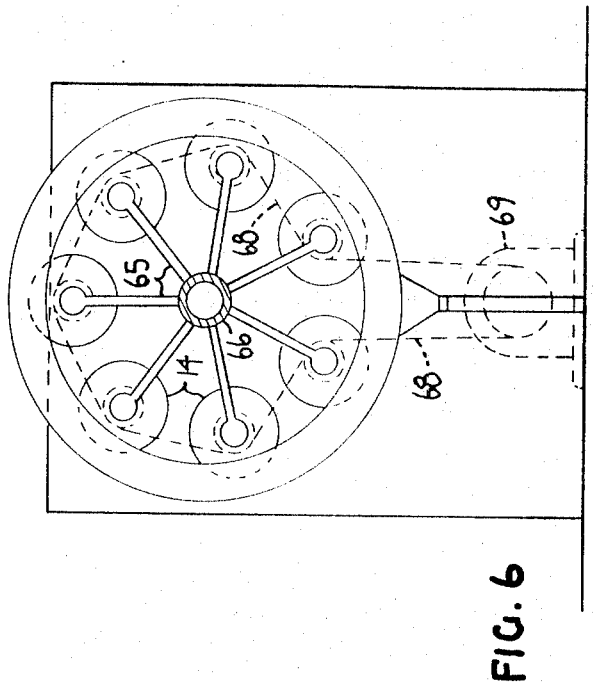
FIG. 6 is a diagrammatic sectional view taken along lines 6—6 of FIG. 5 illustrating the multiple coater.

A cross-sectional view of the coaters is shown in FIG. 6. The coaters are the same as coaters 14 except they are fed with coating material through feed lines 65 from a central source 66 and are rotated by a common belt 68 from a single driving source 69. Seven coaters are shown to coat seven separate strands; however, other multiples can be utilized.

After passing through the coaters, the seven strands are directed through seven separate tube ovens 59 located in cluster 58 previously mentioned. From there, the dried strands are collected in a single group at grouping guide 72 and wound on a take-up package 41 as described above.

The cluster 58 of ovens is shown in greater detail in FIGS. 7 and 8. The tubes 44 are made of stainless steel and are mounted in circular pattern in suitable refractory insulation 75 which is encased in a tubular aluminum enclosure 76. The ends of the tube 76 are closed with transite discs 77 having holes to accommodate the tubes in the proper spaced relation and to hold the insulation material in the enclosure 76. The stainless steel tubes 40 are connected with copper bus bars 78 which are connected to a transformer to provide current for heating the tubes 40.

The cluster 58 is provided near its center with a manifold 80 which takes the place of the insulation in this portion of the cluster. Air from a pressurized source (not shown) is supplied to manifold 80 and it passes into the tubes 40 through holes 85 in the tubes. The air then proceeds from the center of the cluster out to both ends of the tubes. The air carries out of the tubes the moisture from the coating and any carbonized coating which might become deposited on the inside surfaces of the tubes. The use of the plurality of coaters and ovens permits operating at a much higher coating and drying speed since the ability to dry the coated strands is enhanced due to the increased surface area of the separated strands as contrasted to surface area of the strands when grouped together in roving or cord form. Thus increased production can be achieved at each take-up position.

DESCRIPTION OF THE PREFERRED EMBODIMENT

An example of operating conditions for practice of the invention with the apparatus illustrated in FIG. 1 is as follows. A cord composed of glass fibers designated by the trade as G–75's 7/0–S having 2.5 turns per inch is utilized as the input cord 10. The cord is delivered at a speed of 150 feet per minute to a cylindrical chamber 15 which is rotated at 4,500 revolutions per minute. The chamber is 30 inches long, has an inside diameter of 2 inches in the central portion 29 which is 24 inches long and has inlet and exit openings 26 and 28 ½ inch in diameter. The openings 26 and 28 are tapered at each end to diameters of about ¾ inch. The oven 40 is 240 inches long, ½–1 inch in inside diameter and is heated by electric resistance or gas manifold to have an inside wall temperature of about 600 to 800° F. Fresh, dry air is continuously blown from the center or rear to the front section to remove moisture efficiently and also to remove any carbonized residue from the hot tube.

The feed package is located 12 inches from the entrance to the chamber 15. The oven 40 is spaced approximately 36 inches from the exit end of the chamber 15 and 36 inches from traverse 42 which is adjacent to the take-up package 41. The length of cord between feed package 12 and coater 14 should be as small as possible, whereas the length of cord between the coater 14 and traverse 42 should be ample enough to permit storage of additional twist behind the coater. The twist removed ahead of the coater, plus the original twist of the cord is stored behind the coater.

Approximately 2 pounds per hour of a conventional resorcinol formaldehyde latex terpolymer coating such as described in Composition G in U.S. Pat. No. 3,391,052 is fed to the coater 29 through tube 32. The coated cord thus produced contains about 10 percent by weight of uniformly impregnated coating.

The speed of coating and drying can be greatly enhanced by utilizing the multiple coater and oven shown in FIGS. 5 to 8. The seven individual strands can be coated and dried at 750 feet per minute. The simplicity and low cost of the equipment make it economically feasible to coat and dry the strands separately rather than as 7/0 cord.

An advantage of the centrifugal coater and tubular oven arrangement is the simplicity of operation of the equipment. It is easy to thread the textile material through the equipment. There are no pulleys or festoons required in the process. The tension on the textile material is always low throughout the system during curing and wind-up. This is beneficial in both the process and the final product.

Figure 2:
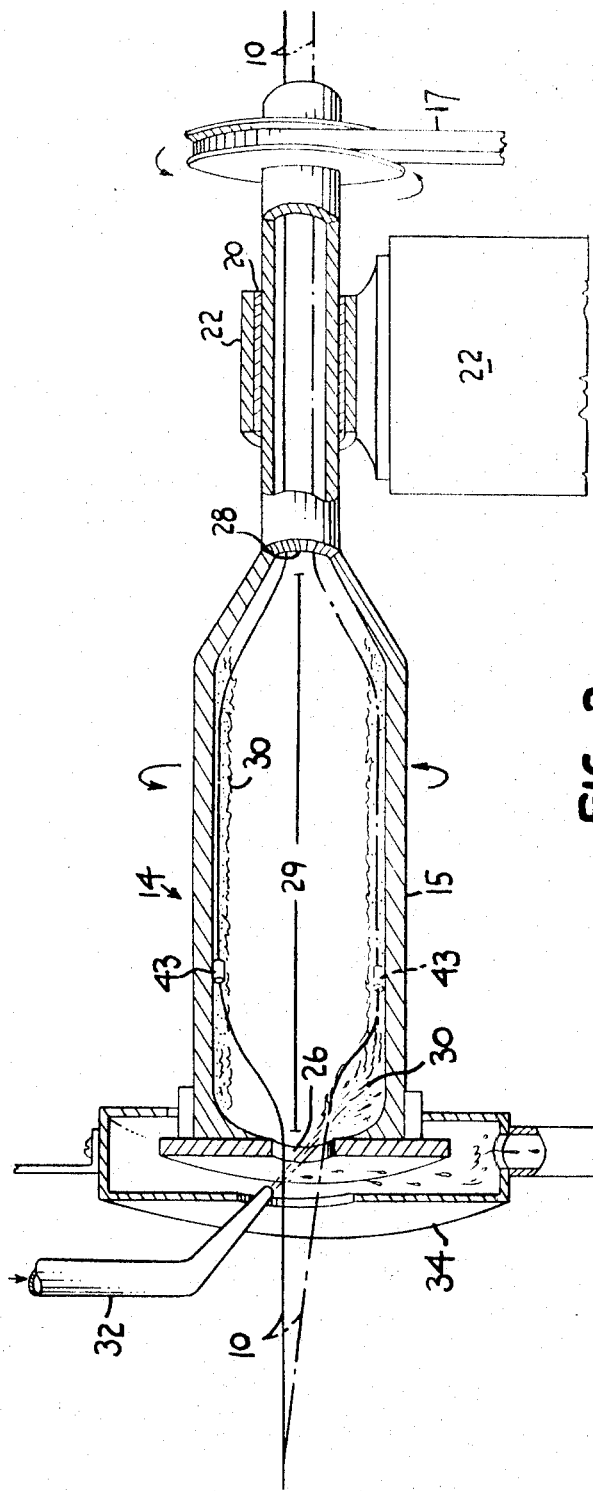
FIG. 2 is an enlarged diagrammatic view, partly in section of the centrifugal coating apparatus employed in the practice of the invention.

Although the present invention has been described with respect to specific details of a preferred embodiment of the invention, it is not intended that such details serve as limitations upon the scope of the invention except insofar as set forth in the accompanying claims. For example, the length and interior diameter of central portion 29 of the centrifugal coater 14 can be modified to achieve the result desired at the speed of rotation employed. A larger diameter and/or greater speed of rotation causes greater centrifugal force to be applied to the coating 30. If separation of the coating occurs because the centrifugal force thereon is too great, the speed of rotation and/or the interior diameter of the central portion 29 of the coater can be reduced. The rotation of the coater and the feed rate of the textile material can be adjusted to obtain the degree of untwisting desired in the method illustrated in FIGS. 1, 2 and 4 or the degree of twisting desired in the method illustrated in FIG. 3.

What is claimed is:

1. Apparatus for coating and drying textile material which comprises means for applying liquid coating to a plurality of separate subgroups of linear textile material, a plurality of tubular elements constructed and arranged so that each will permit passage therethrough of linear textile material, means for spacing the plurality of tubular elements in parallel relation with respect to each other, means to heat each of said tubular elements to elevated temperature, thermal insulation surrounding said tubular elements throughout most of their length, a common manifold surrounding the tubular elements intermediate the ends thereof, means to supply air throuugh said manifold to each of said tubular elements and provide countercurrent air flow to the longitudinal movement of linear textile material through said tubular elements, means to feed linear textile material through each of said tubular elements in a longitudinal direction while imparting sufficient lateral motion thereto to prevent the linear textile material from sticking to the walls of each of said tubular elements and means to remove the dried textile material from each of said tubular elements, comprising means to combine the linear textile material from each of said tubular elements and means to collect the linear textile materials so combined.

(References on following page)

References Cited

UNITED STATES PATENTS

| | | | |
|---|---|---|---|
| 1,945,851 | 2/1934 | Freeland | 34—155 |
| 1,947,476 | 2/1934 | Larson | 34—155 X |
| 1,947,546 | 2/1934 | Reading | 34—155 |
| 2,005,580 | 6/1935 | Ferre | 34—15 X |
| 2,740,725 | 3/1956 | Ball | 118—57 X |
| 2,881,087 | 4/1959 | Schwartz et al. | 118—77 U X |
| 2,944,319 | 7/1960 | Crouzet | 34—155 X |
| 3,065,098 | 11/1962 | Brooks | 118—62 X |
| 3,283,414 | 11/1966 | Crouzet | 34—156 |
| 3,510,960 | 5/1970 | Kubodera | 34—155 |

MORRIS KAPLAN, Primary Examiner

U.S. Cl. X.R.

118—44